United States Patent
Seeger et al.

(10) Patent No.: US 7,300,510 B2
(45) Date of Patent: Nov. 27, 2007

(54) GONIOCHROMATIC BRIGHT PIGMENTS

(75) Inventors: Oliver Seeger, Mannheim (DE); Norbert Mronga, Dossenheim (DE); Rainer Henning, Freinsheim (DE); Raimund Schmid, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 252 days.

(21) Appl. No.: 10/510,962

(22) PCT Filed: May 8, 2003

(86) PCT No.: PCT/EP03/04798

§ 371 (c)(1), (2), (4) Date: Nov. 1, 2004

(87) PCT Pub. No.: WO03/095564

PCT Pub. Date: Nov. 20, 2003

(65) Prior Publication Data

US 2005/0223940 A1 Oct. 13, 2005

(30) Foreign Application Priority Data

May 14, 2002 (DE) .............................. 102 21 497

(51) Int. Cl.
*C04B 14/00* (2006.01)
*C04B 14/04* (2006.01)

(52) U.S. Cl. ...................... 106/401; 106/481; 106/490; 106/491

(58) Field of Classification Search ................ 106/401, 106/481, 490, 491
See application file for complete search history.

(56) References Cited

U.S. PATENT DOCUMENTS

| 3,067,052 | A | * | 12/1962 | Frieser | ....................... 106/404 |
|---|---|---|---|---|---|
| 3,627,553 | A | * | 12/1971 | Clark | ....................... 427/419.8 |
| 5,135,812 | A | | 8/1992 | Phillips et al. | |
| 5,234,496 | A | | 8/1993 | Keiser | |
| 5,763,086 | A | * | 6/1998 | Schmid et al. | ............... 428/404 |
| 5,958,125 | A | * | 9/1999 | Schmid et al. | ............... 106/417 |
| 6,398,862 | B1 | * | 6/2002 | Hechler et al. | ............. 106/404 |
| 6,409,815 | B1 | * | 6/2002 | Hennemann et al. | ....... 106/417 |

FOREIGN PATENT DOCUMENTS

| DE | 197 08 167 | 9/1998 |
|---|---|---|
| DE | 197 46 067 | 4/1999 |
| EP | 254 861 | 2/1988 |
| EP | 634 459 | 1/1995 |
| EP | 668 329 | 8/1995 |
| EP | 708 154 | 4/1996 |
| EP | 753 545 | 1/1997 |
| EP | 832 943 | 4/1998 |
| EP | 940 451 | 9/1999 |
| EP | 959 109 | 11/1999 |
| WO | 93/08237 | 4/1993 |
| WO | 96/34917 | 11/1996 |
| WO | 98/38253 | 9/1998 |
| WO | 99/57204 | 11/1999 |

OTHER PUBLICATIONS

"Effect Pigments—Past, Present and Future", Frank J. Maile, Gerhard Pfaff, and Peter Reynders. Progress in Organic Coatings 54 (2005), pp. 150-163.*

* cited by examiner

*Primary Examiner*—J. A. Lorengo
*Assistant Examiner*—Patricia L. Hailey
(74) *Attorney, Agent, or Firm*—Oblon, Spivak, McClelland, Maier & Neustadt, P.C.

(57) ABSTRACT

Goniochromatic luster pigments comprising at least one dielectric low-refractive interference-colored layer which includes a polar organic solvent which can interact with the layer material via functional groups.

10 Claims, No Drawings

GONIOCHROMATIC BRIGHT PIGMENTS

The invention relates to goniochromatic luster pigments comprising at least one dielectric low-refractive interference-colored layer which includes a polar organic solvent which can interact with the layer material via functional groups.

The invention also relates to a process for preparing these luster pigments and to their use for coloring coatings, inks, including printing inks, plastics, glasses, ceramic products and decorative cosmetic preparations.

The luster or effect pigments are used in many arts, for example in automotive coatings, decorative coatings, plastics pigmentation, paints, printing inks, especially security printing inks, and cosmetics.

Their optical effect is based on the directed reflection of light at predominantly sheetlike, mutually parallel-oriented, metallic or strongly refractive pigment particles. Depending on the composition of the pigment platelets, there are interference, reflection and absorption phenomena which create angular-dependent color and lightness effects.

There is particular interest in goniochromatic luster pigments, which exhibit angle-dependent color change between plural intensive interference colors and hence an attractive color play.

The majority of known goniochromatic luster pigments comprise a platelet-shaped core which is light-reflective and metallic or at least partially transparent to visible light and nonmetallic and which is coated with alternate low-refractive and high-refractive or reflective layers. This type of pigment is described for example in EP-A-668 329, WO-A-96/34917, EP-A-708 154, EP-A-753 545, EP-A-940 451, EP-A-959 109, DE-A-197 46 067 and U.S. Pat. No. 5,135,812.

In addition, WO-A-93/08237 discloses goniochromatic luster pigments based on silicon dioxide platelets coated with a layer of high-refractive metal oxides.

All commercially available goniochromatic luster pigments comprise at least one dielectric low-refractive layer of silicon dioxide or magnesium fluoride in particular that is responsible for the angle-dependent color of the pigments and whose delicate interference colors are enhanced by the combination with reflective (high-refractive or strongly absorbing) layers.

These luster pigments tend to absorb, to the point of saturation, atmospheric or ambient moisture which becomes included in particular in the dielectric low-refractive layer which forms the main constituent of the coating or optical system. As their water content changes, the color properties of the luster pigments change as well. On being subjected to a thermal treatment, which is the case for example in automotive coating with baking finishes, the luster pigments undergo an undesirable change in their color properties after baking owing to the loss of water and constant color properties are only achieved after some hours or days as a result of renewed absorption of water from the environment. This represents an appreciable quality control problem at the coating stage of automotive mass manufacture.

It is known from EP-A-634 459, DE-A-197 08 167, EP-A-832 943 and WO-A-99/57204 to coat luster pigments with silanes in order to improve their orientation and dispersion in the application medium and their condensation resistance.

It is an object of the present invention to provide goniochromatic luster pigments whose color properties change less, and are quicker to stabilize, when used in baking finishes.

We have found that this object is achieved by goniochromatic luster pigments comprising at least one dielectric low-refractive interference-colored layer which includes a polar organic solvent which can interact with the layer material via functional groups.

We have also found preferred goniochromatic luster pigments which have additionally been treated with a silane.

The present invention further provides a process for preparing these luster pigments, which comprises heating the pigment particles in the organic solvent to a temperature $\geq 100°$ C.

The present invention finally also provides for the use of these luster pigments for coloring coatings, inks, including printing inks, plastics, glasses, ceramic products and decorative cosmetic preparations.

The goniochromatic luster pigments of the present invention comprise at least one dielectric low-refractive interference-colored layer. This layer can have been applied as a coating on a substrate platelet or itself form the core of the luster pigments.

The refractive index n of this layer is generally <2, preferably $\leq 1.8$ and more preferably $\leq 1.6$.

Useful layer materials include especially low-refractive metal oxides, metal oxide hydrates and metal fluorides, such as silicon dioxide, silicon oxide hydrate, aluminum oxide, aluminum oxide hydrate and magnesium fluoride.

The geometric layer thicknesses of the low-refractive layer are typically in the range from 80 to 800 nm and especially in the range from 150 to 500 nm.

With regard to the rest of their construction, the goniochromatic luster pigments of the present invention are not in any way restricted; all known pigment types are suitable.

Accordingly, the luster pigments of the present invention can for example be based on low-refractive substrate platelets coated simply with high-refractive material, for example on silicon dioxide platelets coated with metal oxides, such as titanium dioxide or iron(III) oxide, or be multilayered in construction, in which case this substrate material is alternately coated with low-refractive and high-refractive or reflective layers.

The multilayeredly constructed luster pigments can be prepared by successive physical vapor deposition of the desired layer materials on a base film, subsequent removal of the base film from the multilayered deposited film and comminution of the multilayered deposited film to pigment particle size. These luster pigments customarily consist of a central reflective layer especially of metal, for example aluminum, coated front and back initially with a low-refractive material, for example magnesium fluoride, and then with a metal, for example chromium.

Preferably, however, the goniochromatic luster pigments of the present invention are based on platelet-shaped substrate particles which are coated multiply, especially wet-chemically or by chemical vapor deposition.

Useful substrate materials for the luster pigments of the present invention include all platelet-shaped materials which reflect perpendicularly incident light completely or partially (typically to an extent of not less than 10%). These materials are generally high refractive and customarily have a refractive index of generally $\geq 2$ and preferably $\geq 2.4$; they can be opaque, semiopaque or transparent and also colored in reflected or transmitted light.

One group of useful substrate materials are metal platelets. Any metalized effect pigment metals and alloys may be used, for example steel, copper and its alloys such as brass and bronzes and especially aluminum and its alloys such as aluminum bronze. Preference is given to aluminum flakes, which are simple to produce by stamping out of aluminum foil or according to common atomizing and grinding techniques, and it is possible to use commercially available products whose surface, however, should be substantially free of greases or similar coatings and may be passivated, ie stabilized with regard to water in particular.

The metallic substrate particles may if desired already be coated with high-refractive metal compounds, such as high-refractive metal oxide, metal nitride or metal sulfide, especially for example iron oxide or titanium oxide, and therefore already possess a (weak) inherent color due to interference effects with or without absorption. However this coating should not be too thick (from about 5 to 150 nm) in order that the substrate particles may retain their metallic color properties. Furthermore, the metallic substrate particles may also be coated with magnetic materials such as iron, cobalt, nickel or γ-iron(III) oxide and hence be magnetizable.

A further group of suitable substrate materials are nonmetallic platelets which are inherently high refractive or inherently only low refractive and therefore provided with a high-refractive coating.

Examples of particularly suitable inherently high-refractive materials are selectively or nonselectively absorbing materials, for example platelet-shaped metal oxides, sulfides and nitrides such as in particular platelet-shaped (semiopaque) α-iron(III) oxide (α-$Fe_2O_3$, hematite), which may be doped with silicon, aluminum or aluminum and manganese, platelet-shaped (opaque) iron(II/III) oxide ($Fe_3O_4$, magnetite), molybdenum sulfide, boron nitride and graphite platelets. Also suitable are nonabsorbing (colorless) transparent materials such as platelet-shaped bismuth oxychloride, titanium dioxide and zirconium dioxide platelets.

Examples of particularly suitable inherently only low-refractive materials are in particular silicate platelets, such as especially light-colored or white micas, preferably wet-ground muscovite, but also other natural micas, for example phlogopite and biotite, artificial micas, talc flakes and glass flakes.

The high-refractive coating for these low-refractive materials may be in particular high-refractive metal oxides, metal nitrides and metal sulfides such as titanium oxide, zirconium oxide, zinc oxide, tin oxide, bismuth oxychloride, iron oxides, chromium oxide and ilmenite and also reduced titanium compounds containing titanium having oxidation numbers of <4 to 2, such as $Ti_3O_5$, $Ti_2O_3$, TiO, titanium oxynitrides and TiN, which are formed on reducing titania-coated substrates with ammonia, hydrogen and/or hydrocarbons. Preference is given not only to ilmenite but in particular to titanium dioxide and its reduction products and also to iron(III) oxide.

Customary geometric layer thicknesses for these high-refractive coatings lie in the range from about 10 to 300 nm and especially in the range from 20 to 200 nm.

Generally the substrate platelets have average largest diameters of from about 1 to 200 μm and especially from 1 to 100 μm and thicknesses from about 0.1 to 1 μm and especially of around about 0.5 μm in the case of metallic substrates and of around about 0.3 μm in the case of nonmetallic substrates. Their specific free surface area (BET) is typically in the range from 1 to 15 $m^2/g$, and especially from 0.1 to 5 $m^2/g$ in the case of metallic and from 1 to 12 $m^2/g$ in the case of nonmetallic substrates.

Typically, these substrate platelets are coated first with the dielectric low-refractive layer, which may be colorless or selectively absorb visible light, and then with a reflective layer which is at least partially transparent to visible light. It will be appreciated that coating with a plurality of identical or different layer packets of this type is possible, but coating with just one layer packet is preferred.

Customary materials for the low-reflective layer include here as well for example metal oxides and metal oxide hydrates, such as silicon oxide, silicon oxide hydrate, aluminum oxide, aluminum oxide hydrate, aluminum hydroxide and mixtures thereof, preference being given to silicon oxide (hydrate). By incorporating colorants in these oxide layers it is also possible to obtain selectively absorbing coatings.

The reflective layer which completes the optical system may be any of a wealth of materials which can be not only high refractive materials which absorb visible light not at all, selectively or nonselectively but also low-refractive materials which then however have a high absorption constant (generally $\geq 4$) in the visible wavelength region.

Specific examples of particularly useful high-refractive materials are:

nonabsorbing materials:
metal oxides such as titanium dioxide, titanium oxide hydrate, zirconium dioxide, zirconium oxide hydrate, tin dioxide, tin oxide hydrate, zinc oxide, zinc oxide hydrate and mixtures thereof, preference being given to titanium dioxide and titanium oxide hydrate and mixtures thereof with up to about 5% by weight of other metal oxides, especially tin dioxide, but also silicon dioxide; bismuth oxychloride; metal sulfides such as zinc sulfide;

selectively absorbing materials:
metal oxides and nitrides such as particularly preferably iron(III) oxides (α- and γ-$Fe_2O_3$), chromium(III) oxide, titanium(III) oxide and titanium nitrides (TiN and titanium oxynitrides $TiO_xN_y$), the lower titanium oxides and nitrides generally being present in the form of a mixture with titanium dioxide, further bismuth vanadate and molybdenum suboxides (molybdenum blue) and also colorless metal oxide layers "colored" with selectively absorbing colorants, for example metal oxide layers comprising titanium dioxide and zirconium dioxide which have been doped with selectively absorbing metal cations or coated with a colorant-containing film;

nonselectively absorbing materials:
metals which can be deposited by gas phase decomposition of volatile metal compounds, such as particularly preferably molybdenum, preferably iron, tungsten and chromium, also cobalt and nickel and also mixtures thereof, and also metals which can be deposited wet-chemically by reduction of metal salt solutions, such as silver, copper, gold, palladium, platinum and alloys, eg NiP, NiB, NiCo, NiWP, CoP and AgAu; metal oxides such as preferably magnetite ($Fe_3O_4$), also cobalt oxide (CoO, $Co_3O_4$) and vanadium oxide ($VO_2$, $V_2O_3$) and also mixtures of these oxides with the metals, eg magnetite/iron; metal sulfides such as particularly preferably molybdenum sulfide, preferably iron sulfide, tungsten sulfide and chromium sulfide, also cobalt sulfide and nickel sulfide and also mixtures of these sulfides such as $MoS_2/WS_2$ and especially also mixtures of these sulfides with the respective metal, eg $MoS_2$/molybdenum, and mixtures with oxides of the respective metals, eg $MoS_2$/molybdenum oxides; carbon.

An example of a low-refractive but strongly absorbing material is a metal such as aluminum.

The geometric layer thickness of this coating varies as a function of the optical properties of the selected layer material and can be from 1 to about 500 nm. Preferred geometric layer thicknesses range from 5 to 50 nm and especially from 10 to 40 nm in the case of high-refractive nonabsorbing materials and from 1 to 500 nm and especially from 10 to 150 nm in the case of high-refractive selectively absorbing materials. The geometric layer thickness of high-refractive nonselectively absorbing materials is preferably in the range from 1 to 100 nm, particularly preferred layer thicknesses ranging from 1 to 25 nm in the case of strongly absorbing metals such as molybdenum and chromium, from 10 to 50 nm in the case of less strongly absorbing materials such as magnetite and from 5 to 20 nm in the case of metal sulfide materials such as $MoS_2$ layers. In the case of low-refractive strongly absorbing materials the geometric layer thickness is finally preferably in the range from 1 to 25 nm and more preferably in the range from 5 to 20 nm.

Goniochromatic luster pigments are commercially available under the name Variocrom® (BASF), Colorstream® (Merck) and Chromaflair® (Flex Products).

The low-refractive layer on the goniochromatic luster pigments of the present invention includes a polar organic solvent whose molecules are small enough to fit into the molecular lattice of this layer and which contains functional groups which are capable of interacting with the molecular lattice and hence able to durably fix the solvent in the lattice.

This solvent is therefore capable of substantially displacing water molecules already incorporated in this layer and of substantially preventing any renewed incorporation of water molecules in this layer. As a result, the thickness of this layer and hence also its color properties are kept substantially constant.

The molecular volume of this solvent is accordingly in general in the range from 60 to 500 Å$^3$.

Useful functional groups include for example hydroxyl groups and amide groups. Hydroxyl groups are preferable and fix the solvent molecules in an $SiO_2$ lattice by etherification. Amide groups first have to be hydrolyzed and then likewise bind the solvent molecules via ether linkages.

Examples of particularly preferred solvents are ethylene glycol, glycerol and formamide, of which ethylene glycol is very particularly preferred.

The goniochromatic luster pigments of the present invention are obtainable by thermal treatment with the polar organic solvent.

The thermal treatment with the polar organic solvent is customarily carried out by heating a suspension of the pigment particles in the solvent, preferably with stirring, to a temperature in the range from 100° C. to the particular reflux temperature. When ethylene glycol is used as a solvent, the suspension is preferably heated to not less than 150° C. and more preferably to not less than 180° C.

The suspension generally has a pigment content of about 1-50% by weight and especially from 10 to 40% by weight.

The thermal treatment with the solvent generally takes from 0.5 to 120 h and preferably from 2 to 12 h.

Particularly advantageous luster pigments are obtained by additional treatment with a silane. It will be appreciated that a mixture of various silanes can be used as well in this additional treatment.

Silanes which are especially useful for this purpose have from 1 to 3 hydrolyzable alkoxy groups and bear from 1 to 3 organic radicals which are attached to the silicon atom via a carbon atom and which may be functionalized.

Particularly suitable silanes therefore have the general formula I $$R_a SiX_b \qquad \text{I}$$

where:
  R represents $C_1$-$C_{18}$-alkyl radicals which may be singly or multiply unsaturated and/or substituted by $C_1$-$C_6$-alkanoloxy, halogen, amino and/or saturated or unsaturated $C_1$-$C_6$-alkoxy which may contain an epoxy group, and each R is the same or different for a>1;
  X is $C_1$-$C_4$-alkoxy and each X may be the same or different for b>1;
  a is 1, 2 or 3;
  b is 1, 2 or 3, with the proviso that the sum a+b=4.

Very particularly suitable silanes have the general formula Ia $$R'SiX'_3 \qquad \text{Ia}$$

where:
  R' is vinyl or propyl which may be substituted in the terminal position by saturated or unsaturated $C_2$-$C_4$-alkoxy which may contain an epoxy group; and
  X' is methoxy or ethoxy.

Specific examples of suitable silanes are:
dimethyldiethoxysilane, trimethylethoxysilane,
propyltrimethoxysilane, isobutyltrimethoxysilane,
octyltriethoxysilane, hexadecyltriethoxysilane,
vinyltrimethoxysilane, allyltrimethoxysilane,
vinyldimethylethoxysilane, acetoxypropyltriethoxysilane,
trifluoropropyltrimethoxysilane, aminopropyltriethoxysilane,
3-methacryloyloxypropyltriethoxysilane,
3-glycidyloxypropyltrimethoxysilane,
3-glycidyloxypropylmethyldiethoxysilane and
3-glycidyloxypropyldimethylethoxysilane, of which
3-glycidyloxypropyltrimethoxysilane, vinyltrimethoxysilane,
3-methacryloxypropyltrimethoxysilane and propyltriethoxysilane are preferred.

When the goniochromatic luster pigments of the present invention are treated with a silane, they are generally treated with from 0.1 to 20% by weight and preferably from 1 to 10% by weight of silane.

The silane may be added before, during or after the heating in the polar organic solvent. It will be appreciated that the silane can also be added a little at a time at various times.

Preferably, the pigment particles are initially subjected to a thermal treatment with the solvent only, then admixed with the silane and heated at from 50° C. to the reflux temperature and preferably to not less than 100° C. and, when ethylene glycol is used, particularly preferably to not less than 180° C. for a further 0.5-12 h and especially from 1 to 4 h.

It may be preferable to use prehydrolyzed silane. To this end, the silane is admixed beforehand with water, an aqueous inorganic or organic acid (eg hydrochloric acid, nitric acid, phosphoric acid, formic acid, acetic acid) or an aqueous inorganic base (eg ammonia, sodium hydroxide, potassium hydroxide, sodium carbonate).

However, it is also possible for the silane and the aqueous acid or base to be added to the pigment suspension in succession.

The luster pigments which have been treated either with the polar organic solvent only or else with silane are conveniently isolated by filtration, either after cooling to room temperature or hot, preferably at from 60 to 130° C.

The pigment is customarily washed with further solvent (eg ethylene glycol) or with a solvent which is miscible with the first solvent, examples of the second solvent being butyl acetate, propoxypropanol, methyl ethyl ketone, ethylene glycol monobutyl ether, diethylene glycol monobutyl ether). When the solvent chosen is the solvent in which the luster pigments are later to be used, the pigment paste obtained can be used direct or after drying at about 60-150° C.

The goniochromatic luster pigments of the present invention are very useful for coloring a very wide range of application media, especially coatings, inks, including printing inks, plastics, glasses, ceramic products and decorative cosmetic preparations.

They have particular importance for the coloring of powder coatings and especially of baking finishes, such as solvent-containing low-solids, medium-solids and high-solids systems and equivalent waterborne systems, which are typically baked at from 100 to 200° C.

When used for this purpose, they have distinctly more constant color properties, specifically a distinctly reduced change in the color properties and a substantially faster attainment of a stable end-stage, compared with the untreated pigment.

If desired, the goniochromatic luster pigments of the present invention can additionally be coated with customary pigment additives in order, for example, that dispersion or orientation in the application medium may be improved.

EXAMPLES

A) Preparation of inventive luster pigments

Example 1

A suspension of 300 g of an aluminum pigment obtained similarly to Example 1 of EP-A-708 154 with silicon dioxide and iron(III) oxide coatings (average particle diameter of aluminum platelets: 17 μm, $SiO_2$ content: 63% by weight, $Fe_2O_3$ content: 10% by weight) in 1.5 l of ethylene glycol was heated under reflux (191° C.) for 4 h. After cooling to 110° C., the pigment was filtered off and washed with further ethylene glycol to obtain a 72% by weight pigment paste.

Example 2

A suspension of 300 g of the luster pigment of Example 1 in 1.5 l of ethylene glycol was refluxed for 4 h. After addition of 16.5 g of 3-glycidyloxypropyltrimethoxysilane over 10 min, refluxing at 191° C. was continued for a further 2 h. Working up as in Example 1 gave a 74% by weight pigment paste.

Example 3

Example 2 was repeated using just 8.3 g of 3-glycidyloxypropyltrimethoxysilane.

Example 4

Example 2 was repeated using just 4.1 g of 3-glycidyloxypropyltrimethoxysilane.

Example 5

Example 2 was repeated using just 17.4 g of 3-methacryloxypropyltriethoxysilane.

Example 6

Example 2 was repeated using 10.4 g of vinyltrimethoxysilane.

Example 7

Example 2 was repeated using 7.5 g of propyltriethoxysilane.

Example 8

Example 2 was-repeated except that the mixture was heated to 170° C. only each time. A 72% by weight pigment paste was obtained.

Example 9

Example 2 was repeated except that the pigment paste was dried at 100° C.

Example 10

Example 2 was repeated except that the pigment paste was dried at 130° C.

Example 11

A suspension of 300 g of the luster pigment of Example 1 in 1.5 l of ethylene glycol was refluxed for 4 h. After cooling the suspension to 120° C. and adding 16.5 g of 3-glycidyloxypropyltrimethoxysilane over 10 min, stirring was continued at that temperature for a further 2 h. Working up as in Example 1 gave a 72% by weight pigment paste.

Example 12

Example 2 was repeated using just 150 g of luster pigment and 8.3 g of 3-glycidyloxypropyltrimethoxysilane prehydrolyzed by addition of 1 ml of water and 1 ml of concentrated acetic acid 1 h before use. A 72% by weight pigment paste was obtained.

Example 13

Example 2 was repeated using 300 g of an aluminum pigment obtained similarly to Example 1 of EP-A-708 154 with silicon dioxide and iron(III) oxide coatings (average particle diameter of aluminum platelets: 16 μm, $SiO_2$ content: 62% by weight, $Fe_2O_3$ content: 14% by weight). A 70% by weight pigment paste was obtained.

Example 14

Example 13 was repeated except that refluxing was initially carried out for 8 h and then, after addition of the silane, for a further 6 h. A 74% by weight pigment paste was obtained.

B) Use of Inventive Luster Pigments

To evaluate the color properties of the pigments obtained, 32 g of each pigment were stirred into 768 g of a waterborne acrylate-based baking finish (20% by weight solids content) and dispersed therein for 30 min using a propeller stirrer at 1700 rpm. The coatings obtained were then sprayed onto a black and white coated aluminum panel to opacity in 6 passes, flashed off for 15 min, overcoated with a waterborne baking clearcoat and baked at 130° C. for 30 min.

The CIELAB coordinates were measured using a Multi-flash goniospectrophotometer from Optronik at 25° from the specular angle after 0.5 h, 1 h and 24 h after the baking step. The color difference dE* of the measurements after 1 h and after 24 h (sample) were then determined against the measurement after 0.5 h (standard) using the following formula:

$$dE^* = [(dL^*)^2 + (da^*)^2 + (db^*)^2]^{1/2}$$

where:
- $dL^* = L^*_p - L^*_b$: lightness difference of sample from standard
- $da^* = a^*_p - a^*_b$: red-green difference of sample from standard
- $db^* = b^*_p - b^*_b$: yellow-blue difference of sample from standard The color difference dE* is a measure of the magnitude of the difference between a sample and a standard with regard to chroma, hue and lightness. The smaller the dE* value, the better the agreement in the color properties of sample and standard.

The results obtained are shown in the table which follows, which also lists the respective untreated pigments (comp. 1 and comp. 13) for comparison.

TABLE

| Luster pigment of Example | dE* after 1 h | dE* after 24 h |
|---|---|---|
| comp. 1 | 0.8 | 6.5 |
| 1 | 0.4 | 1.8 |
| 2 | 0.2 | 0.9 |
| 3 | 0.2 | 1.5 |
| 4 | 0.3 | 1.6 |
| 5 | 1.4 | 2.6 |
| 6 | 0.8 | 1.5 |
| 7 | 1.8 | 2.7 |
| 8 | 1.6 | 2.4 |
| 9 | 1.3 | 2.2 |
| 10 | 1.8 | 2.5 |
| 11 | 0.6 | 2.1 |
| 12 | 0.6 | 2.1 |
| comp. 13 | 0.9 | 6.8 |
| 13 | 0.9 | 0.9 |
| 14 | 1.1 | 1.1 |

The invention claimed is:

1. Goniochromatic luster pigments, comprising:
    at least one dielectric low-refractive interference-colored layer which comprises
        a polar organic solvent which can interact with the layer material via hydroxyl or amide groups;
        said layer having a geometric layer thickness in the range from 80 to 800 nm.

2. Goniochromatic luster pigments as claimed in claim 1, comprising:
    at least one dielectric low-refractive interference-colored layer which has been subjected to a thermal treatment in said polar organic solvent.

3. Goniochromatic luster pigments as claimed in claim 1, wherein the organic solvent is ethylene glycol.

4. Goniochromatic luster pigments as claimed in claim 1, which have additionally been treated with a silane.

5. Goniochromatic luster pigments as claimed in claim 4, which have been treated with a silane of the general formula I $$R_aSiX_b \qquad I$$

wherein
    R represents $C_1$-$C_{18}$-alkyl radicals which may be singly or multiply unsaturated and/or substituted by $C_1$-$C_6$-alkanoloxy, halogen, amino and/or saturated or unsaturated $C_1$-$C_6$-alkoxy which may contain an epoxy group, and each R is the same or different for a>1;
    X is $C_1$-$C_4$-alkoxy and each X may be the same or different for b>1;
    a is 1, 2 or 3;
    b is 1, 2 or 3, with the proviso that the sum a+b=4.

6. Goniochromatic luster pigments as claimed in claim 4, which have additionally been treated with a silane of the general formula Ia $$R'SiX'_3 \qquad Ia$$

where:
    R' is vinyl or propyl which may be substituted in the terminal position by saturated or unsaturated $C_2$-$C_4$-alkoxy which may contain an epoxy group; and
    X' is methoxy or ethoxy.

7. The process for preparing goniochromatic luster pigments as claimed in claim 4, which comprises adding the silane before, during and/or after the heating in a polar organic solvent.

8. A process for preparing goniochromatic luster pigments as claimed in claim 1, which comprises heating the pigment particles in the polar organic solvent to a temperature ≧100° C.

9. Coloring coatings, inks, printing inks, plastics, glasses, ceramic products or decorative cosmetic preparations, comprising: the goniochromatic luster pigments as claimed in claim 1.

10. Coloring baking finishes or powder coatings, comprising: the goniochromatic luster pigments as claimed in claim 1.

* * * * *